(12) United States Patent
Lin et al.

(10) Patent No.: US 8,517,046 B2
(45) Date of Patent: Aug. 27, 2013

(54) REDUNDANT METAL-TO-METAL SEALS FOR USE WITH INTERNAL VALVES

(75) Inventors: Chun Lin, McKinney, TX (US); Roy Ronald Pelfrey, Sherman, TX (US); Eric Alan Miller, McKinney, TX (US)

(73) Assignee: Emerson Process Management Regulator Technologies, Inc., Mckinney, TX (US)

( * ) Notice: Subject to any disclaimer, the term of this patent is extended or adjusted under 35 U.S.C. 154(b) by 515 days.

(21) Appl. No.: 12/617,143

(22) Filed: Nov. 12, 2009

(65) Prior Publication Data

US 2010/0252770 A1  Oct. 7, 2010

Related U.S. Application Data

(60) Provisional application No. 61/166,521, filed on Apr. 3, 2009.

(51) Int. Cl.
*F16K 43/00* (2006.01)

(52) U.S. Cl.
USPC ............ 137/329.02; 137/516.29; 137/599.18; 137/630; 251/253; 251/259; 251/332; 251/333

(58) Field of Classification Search
USPC ............. 137/329.01, 329.02, 329.04, 516.27, 137/516.29, 630, 599.18; 251/253, 257, 251/263, 332, 259, 333
See application file for complete search history.

(56) References Cited

U.S. PATENT DOCUMENTS

| | | | | |
|---|---|---|---|---|
| 1,004,320 A | * | 9/1911 | Webster | 137/329.04 |
| 1,949,874 A | * | 3/1934 | Paterson et al. | 137/329.04 |
| 2,178,876 A | * | 11/1939 | Macclatchie | 137/329.04 |
| 2,192,425 A | * | 3/1940 | Allen et al. | 137/329.04 |
| 2,689,581 A | | 9/1954 | Davenport | |
| 3,022,797 A | * | 2/1962 | Allin | 137/599.16 |
| 3,547,400 A | | 12/1970 | Burtness | |
| 3,631,893 A | | 1/1972 | Seaman et al. | |
| 3,807,442 A | * | 4/1974 | Sumner et al. | 137/498 |
| 3,844,312 A | | 10/1974 | Sumner et al. | |
| 4,518,329 A | * | 5/1985 | Weaver | 417/566 |
| 5,123,436 A | * | 6/1992 | Koechlein et al. | 137/12 |
| 6,062,540 A | | 5/2000 | Hubler | |
| 7,222,837 B1 | * | 5/2007 | Blume | 251/332 |
| 8,146,885 B2 | * | 4/2012 | Lin et al. | 251/214 |

FOREIGN PATENT DOCUMENTS

FR 1.322.813 A 4/1963
GB 1337524 A 11/1973

OTHER PUBLICATIONS

Patent Cooperation Treaty, "International Search Report," issued by the International Searching Authority in connection with related PCT application No. PCT/US2010/029097, mailed Aug. 5, 2010 (5 pages).
Patent Cooperation Treaty, "Written Opinion of the International Searching Authority," issued by the International Searching Authority in connection with related PCT application No. PCT/US2010/029097, mailed Aug. 5, 2010 (6 pages).

* cited by examiner

*Primary Examiner* — John K Fristoe, Jr.
*Assistant Examiner* — Matthew W Jellett
(74) *Attorney, Agent, or Firm* — Hanley, Flight and Zimmerman, LLC

(57) ABSTRACT

Redundant metal-to-metal seals for use with internal valves are described. A plug having redundant sealing functionality for use with a poppet of an internal valve includes a tapered surface to sealingly engage a seat of the poppet. Additionally, the plug includes a seal adjacent the tapered surface and disposed in a groove defined by the plug to sealingly engage the seat.

18 Claims, 13 Drawing Sheets

REDUNDANT METAL-TO-METAL SEALS FOR USE WITH INTERNAL VALVES

RELATED APPLICATION

This application claims priority to U.S. Provisional Application No. 61/166,521 filed on Apr. 3, 2009, which is hereby incorporated herein by reference in its entirety.

FIELD OF THE DISCLOSURE

This patent relates generally to integral seals and, more specifically, to redundant metal-to-metal seals for use with internal valves.

BACKGROUND

Internal valves are used in a variety of commercial and industrial applications to control fluid flow between a fluid storage container and another container, hose, pipeline, etc. Typically, internal valves are provided with an equalization member to equalize fluid pressure across the valve prior to fully opening the valve. The rate at which the fluid pressure equalizes across the valve is associated with the size of the valve and the fluid flow rate through the equalization member.

To equalize the pressure across known internal valves, these valves are typically provided with a stem having a cut-away portion or grove that varies the fluid flow rate through the equalization member depending on the position of the cut-away portion or groove relative to an aperture that fluidly couples the valve to the container, hose, pipeline, etc. Specifically, if the cut-away portion or groove is adjacent the aperture, the size of the fluid flow path is relatively large and, in contrast, if the cut-away portion or groove is at a distance from the aperture, the size of the fluid flow path is relatively small.

SUMMARY

A plug having redundant sealing functionality for use with a poppet of an internal valve includes a tapered surface to sealingly engage a seat of the poppet. Additionally, the plug includes a seal adjacent the tapered surface and disposed in a groove defined by the plug to sealingly engage the seat.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to internal valves that provide redundant metal-to-metal seals that extend the maintenance intervals at which a worn seal must be replaced and/or decrease the urgency to replace a worn or defective seal. Specifically, the example internal valves described herein are provided with a plug that includes an upper retainer and a lower retainer that include tapered surfaces between which a seal is positioned. The upper and lower retainers and the seal are positioned proximate a seat of a poppet such that in the event that the seal becomes dislodged or otherwise non-existent, the tapered surfaces of the upper and/or lower retainers engage the seat of the poppet when the internal valve is in a closed position, thereby providing redundant and/or integral sealing functionality. Specifically, the proximity of the upper and lower retainers relative to the seat of the poppet when the internal valve is in the closed position substantially prevents a stem positioned in the internal valve from moving toward and eventually engaging a cam as the seal between the retainers wears. Such engagement decreases the functionality of known internal valves because the plug and the poppet are unable to properly seat, thereby enabling fluid to flow through the internal valve.

Figure 1:
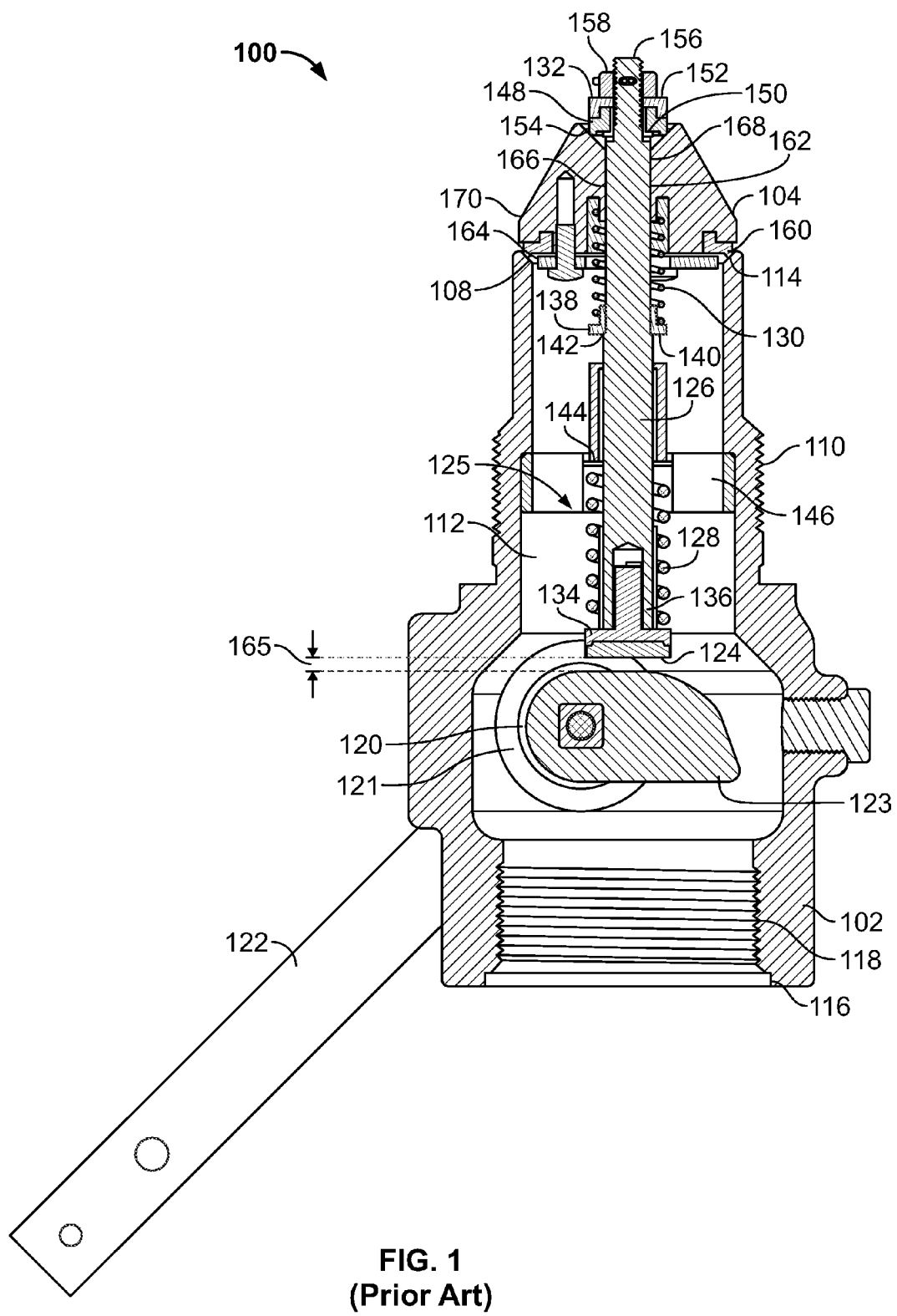
FIG. 1 depicts a known internal valve.

FIG. 1 depicts a known internal valve 100 that has a body 102, a poppet 104 and a bonnet assembly (not shown), which is coupled to the body 102. The poppet 104 sealingly engages a seat 108 of the body 102 to control fluid flow through the internal valve 100.

The body 102 includes exterior threads 110 that engage an opening (not shown) of a chamber or tank (not shown) such as a pumping system, a stationary storage tank, transport truck, etc. Additionally, the body 102 defines a bore 112 having a first opening 114 and a second opening 116 to fluidly couple the chamber or tank to another chamber, a hose, a pipeline, etc. Specifically, the bore 112 includes internal threads 118 to threadingly engage another body (not shown) such as, for example, a coupling of an LPG hose.

The bonnet assembly includes a shaft 120 that is partially positioned within and rotatably coupled to a bonnet 121. The shaft 120 is coupled to an external lever 122 to rotate the shaft 120 relative to the bonnet 121 and the body 102. Opposite the external lever 122, the shaft 120 is coupled to a cam 123 positioned within the bore 112. Generally, as the shaft 120 is rotated, the cam 123 engages a surface 124 to move a stem assembly 125 within the bore 112.

The stem assembly 125 includes a stem 126, a first spring 128, a second spring 130 and a plug 132. A first spring seat 134 is coupled to an end 136 of the stem 126 and is positioned opposite a second spring seat 138 that surrounds the stem 126. To position the second spring seat 138 relative to the stem 126, a surface 140 of the second spring seat 138 engages a step 142 defined by the stem 126. The first spring 128 is positioned between the first spring seat 134 and a surface 144 of a guide bracket 146, and the second spring 130 is positioned between the second spring seat 138 and the poppet 104.

The plug 132 is coupled to the stem 126 opposite the first spring seat 134. The plug 132 includes a molded disc 148 to engage a seat 154 of the poppet 104 and is positioned between opposing retainers 150 and 152. To couple the plug 132 to the stem 126, the stem 126 includes a threaded end 156 that receives a nut 158. Opposite the seat 154, the poppet 104 includes a seal 160 to engage the seat 108 of the body 102. The seal 160 is coupled to the body 102 via a plate 164.

Generally, in the closed position, the molded disc 148 engages the seat 154 and the seal 160 engages the seat 108 of the body 102 to substantially prevent fluid from flowing through the internal valve 100. Additionally, the molded disc 148 is configured to position the stem 126 such that a gap 165 exists between the surface 124 of the stem assembly 125 and the cam 123 when the molded disc 148 engages the seat 154. The gap 165 enables the first spring 128 to urge the plug 132 and the poppet 104 toward the body 102 via the stem 126 to control (e.g., prevent) fluid flow though the internal valve 100. However, the gap 165 decreases as the molded disc 148 wears due to, for example, operational conditions. This wear causes the surface 124 to become increasingly closer to and eventually engage the cam 123 when the internal valve 100 is in the closed position.

Figure 2:
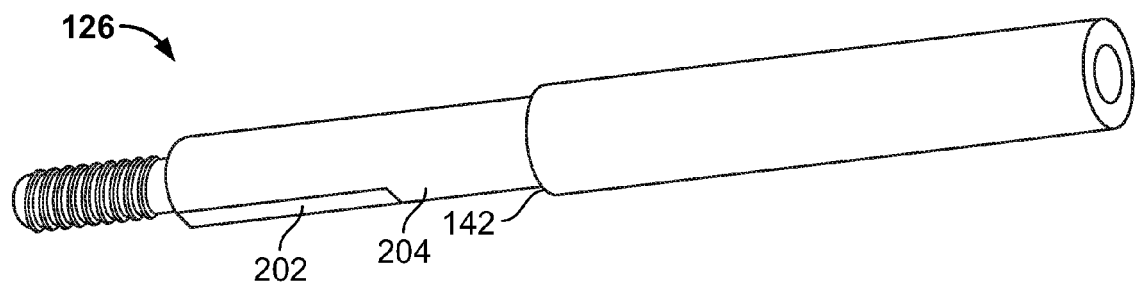
FIG. 2 depicts a stem used to implement the known internal valve of FIG. 1.

In operation, to equalize a pressure between a chamber or tank in which the internal valve 100 is mounted and the other chamber, hose, pipeline, etc. coupled to the second opening 116, the external lever 122 is rotated to position the cam 123 at a mid-point (e.g., 70° travel). Positioning the cam 123 at the mid-point moves the stem assembly 125 to disengage the plug 132 and, thus, the molded disc 148 from the seat 154 and positions a cut-away portion or groove 202 (FIG. 2) of the stem 126 adjacent to an aperture 162. Positioning the cut-away portion or groove 202 adjacent the aperture 162 increases the size of a fluid flow channel 166 between the stem 126 and a surface 168 of the aperture 162, thereby enabling a relatively large amount of fluid to bleed between the chamber or tank and the other chamber, hose, pipeline, etc. to equalize the pressure across the internal valve 100.

Once the fluid pressure is equalized, the internal valve 100 may be fully opened. Specifically, the external lever 122 may be rotated to position the cam 123 at a high-point. Positioning the cam 123 at the high-point moves the stem assembly 125 to enable the seal 160 of the poppet 104 to disengage the seat 108 to allow fluid to flow from the other chamber, tank, etc. in which the internal valve 100 is mounted through the first opening 114. However, if the fluid flow increases to a magnitude greater than a predetermined fluid flow (e.g., an excess flow limit), a force exerted by the fluid flow against an external surface 170 of the poppet 104 overcomes a force exerted by the second spring 130 and causes the seal 160 of the poppet 104 to re-engage the seat 108 even though the cam 123 is positioned at the high-point. In this position, while the seal 160 of the poppet 104 engages the seat 108, the plug 132 is at a distance or spaced from the seat 154 of the poppet 104 and a cylindrical portion 204 (FIG. 2) of the stem 126 is positioned adjacent the aperture 162. Positioning the cylindrical portion 204 (FIG. 2) adjacent the aperture 162 decreases the size of the fluid flow channel 166 between the stem 126 and the surface 168 of the aperture 162 enabling a relatively small amount of fluid to bleed between the chamber or tank and the second opening 116.

Figure 3:
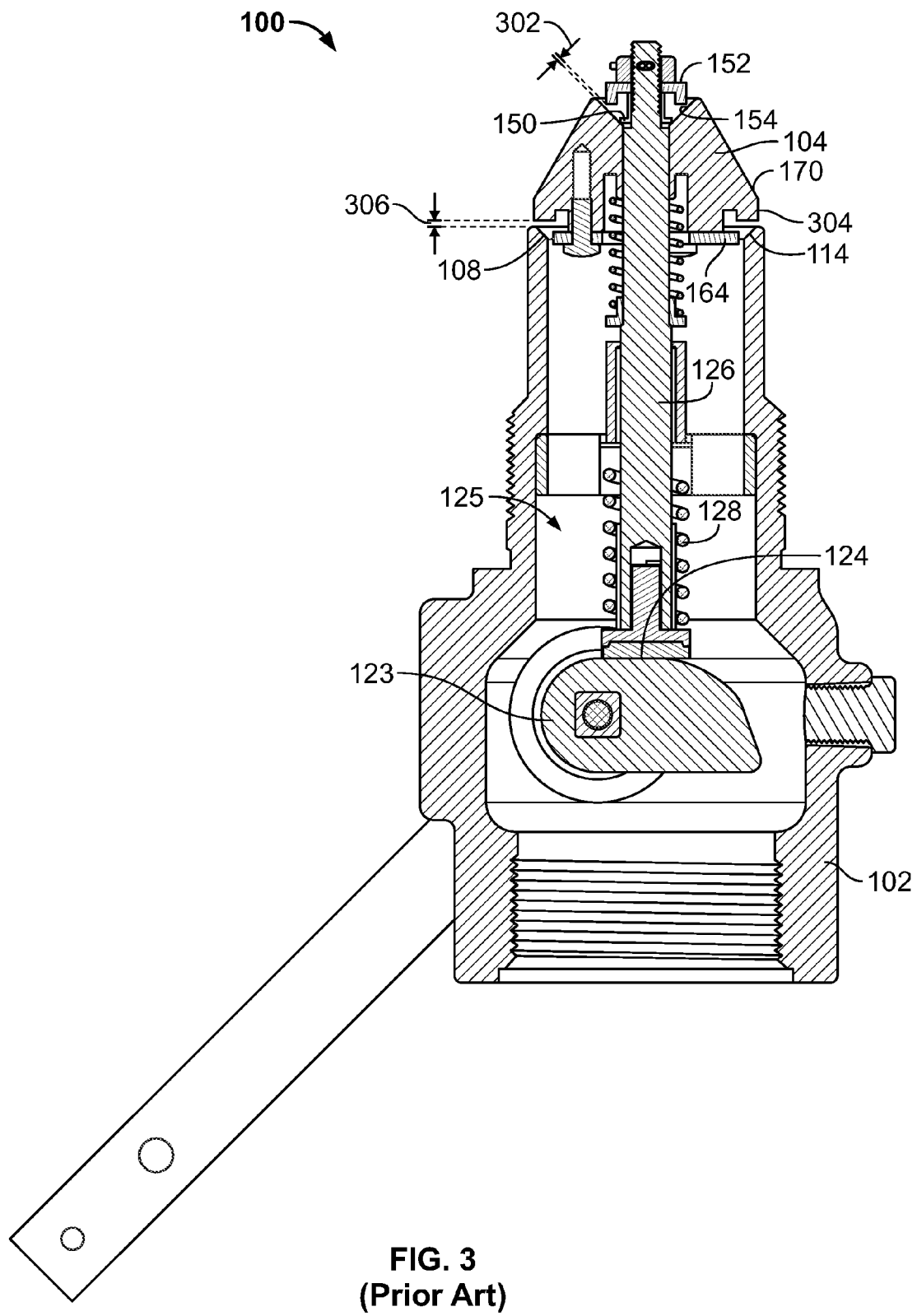
FIG. 3 depicts the known internal valve of FIG. 1 without some of the seals.

Due to operating conditions and/or the extent of use, the molded disc 148 and/or the seal 160 may wear and/or become non-existent over time, thereby reducing or failing completely to provide their sealing functionality. To illustrate such an example, FIG. 3 depicts the internal valve 100 of FIG. 1 without the molded disc 148 or the seal 160.

Figure 4:
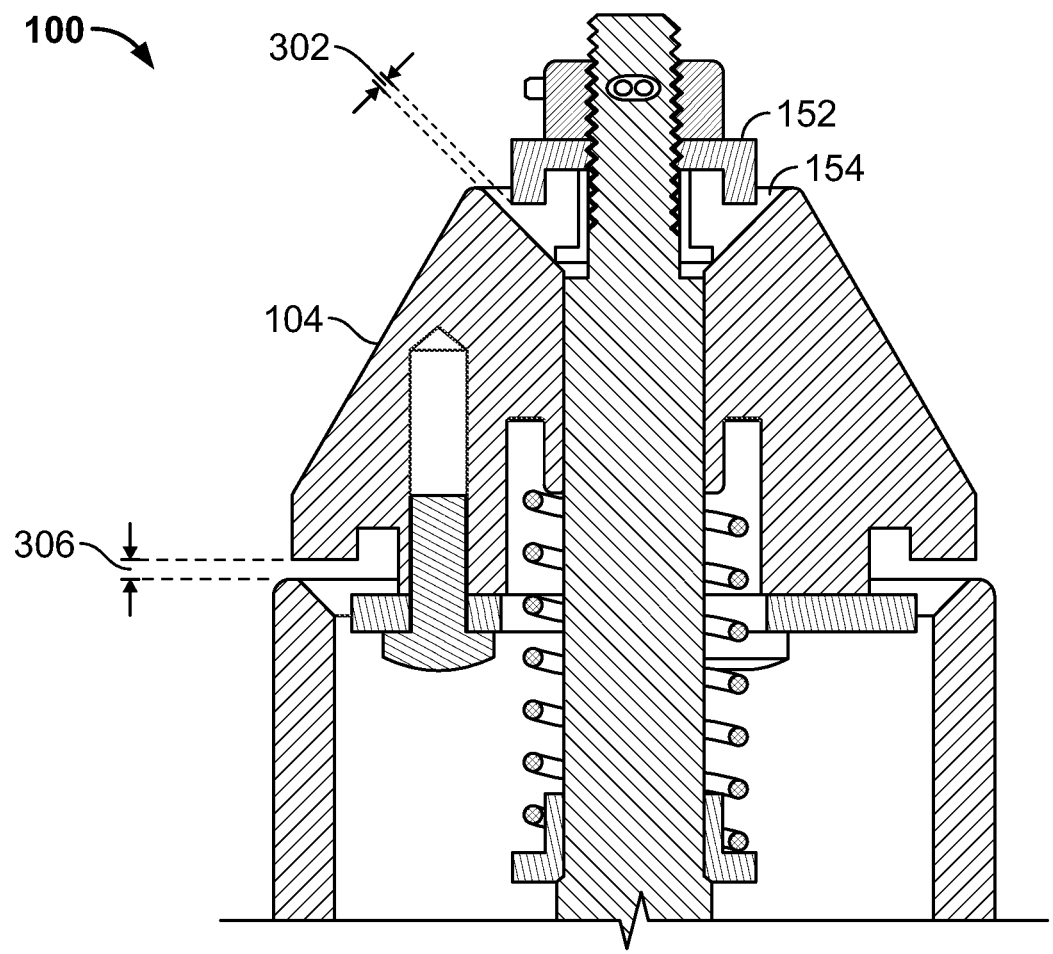
FIG. 4 depicts an enlarged view of the internal valve of FIG. 3.

As discussed above, the interaction between the molded disc 148 and the seat 154 positions the stem 126 such that the gap 165 exists between the surface 124 and the cam 123. The gap 165 enables the first spring 128 to extend and urge the plug 132 and, thus, the poppet 104 toward the body 102. However, if the gap 165 does not exist, the surface 124 engages the cam 123, thereby preventing the first spring 128 from moving the stem 126 so that the plug 132 engages the seat 154. As a result, the poppet 104 may not engage the seat 108. Specifically, if the surface 124 engages the cam 123 when the internal valve 100 is in the closed position, a gap 302 (shown most clearly in FIG. 4) exists between the seat 154 and the retainer 152, which permits fluid to freely flow through the poppet 104 because of the position of the cutaway portion or groove 202 (FIG. 2) relative to the aperture 162. Additionally, because of the gap 302 between the plug 132 and the seat 154, the poppet 104 is not secured relative to the body 102, permitting the poppet 104 to float or move in an uncontrollable or random manner between a semi-open position (shown in FIGS. 3 and 4) and a closed position in which a surface 304 of the poppet 104 engages the seat 108 of the body 102. Specifically, the position of the poppet 104 relative to the body 102 depends on the magnitude of the fluid flow and/or fluid pressure acting against the external surface 170 and/or the plate 164. In the semi-open position, a gap 306 (shown most clearly in FIG. 4) exists between the poppet 104 and the seat 108, which permits fluid to freely flow through the first opening 114.

Figure 5:
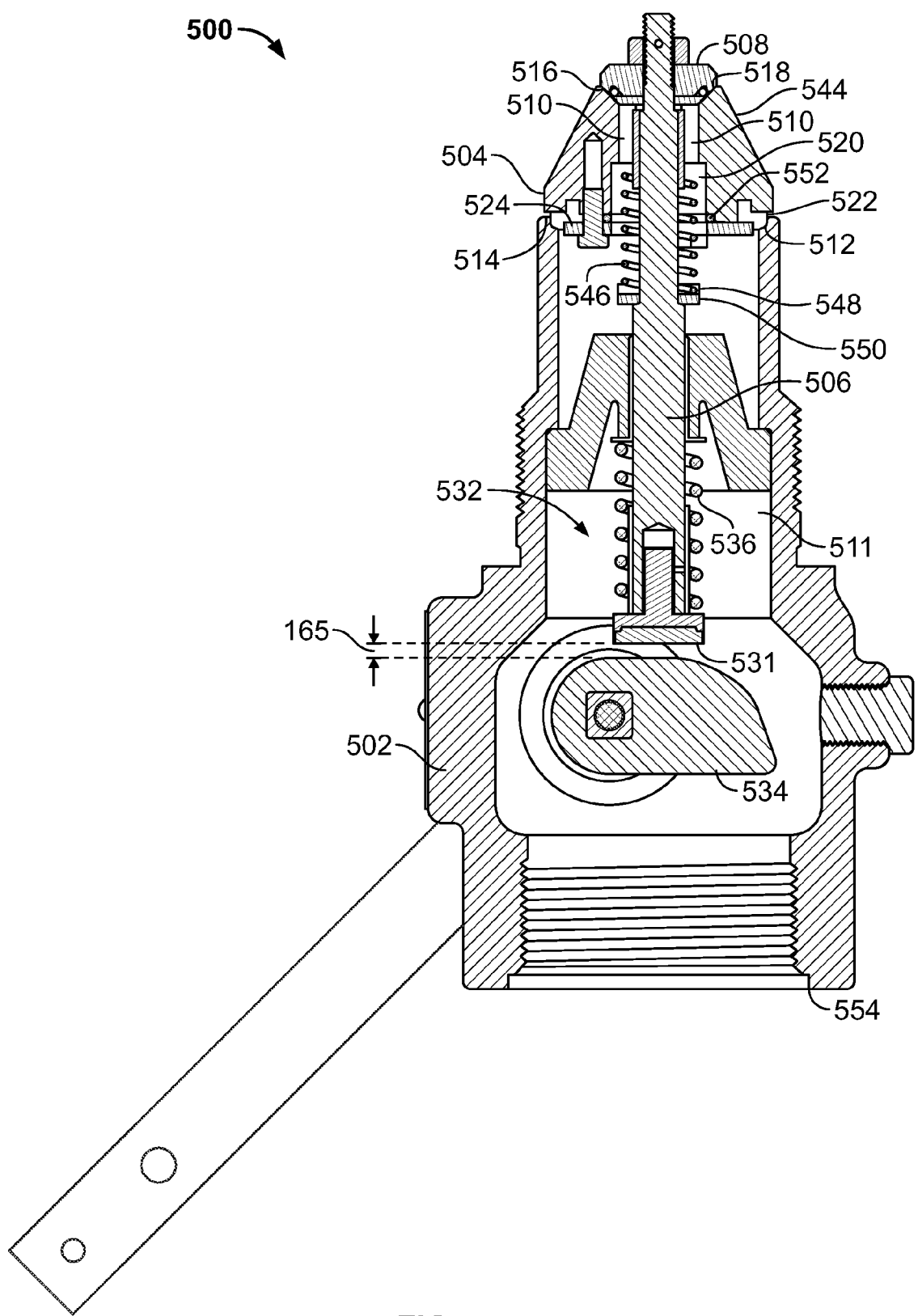
FIG. 5 depicts an example internal valve.

FIG. 5 depicts an example internal valve 500 that includes a body 502, an example flow control member or poppet 504, a stem 506 and an example plug 508. Any of the components 502-508 of the internal valve 500 may be made of the same or different material(s) such as, for example, a metal material, a rubber material and/or a synthetic material. In contrast to the internal valve 100 of FIGS. 1, 3 and 4, the example poppet 504 includes a plurality of fluid flow channels 510 to fluidly couple a chamber 511 of the internal valve 500 to another chamber or vessel, eliminating the need for the cut-away portion or groove 202 (FIG. 2) of the stem 126 (FIG. 1), as described above, while still enabling a relatively large amount of fluid to bleed across the internal valve 500 depending on the position of the internal valve 500. Generally, varying the size and/or shape of the plurality of fluid flow channels 510 changes the rate at which pressure across the internal valve 500 equalizes, which also changes the rate at which the internal valve 500 may be fully opened.

To control the flow of fluid through the internal valve 500, the poppet 504 has a sealing surface 512 to engage a surface or seat 514 of the body 502 and a seat 516 to receive or be engaged by a sealing surface 518 of the plug 508. The sealing surface 512 surrounds an aperture 520 that receives the stem 506 and includes a seal, gasket or o-ring 522 positioned between the poppet 504 and a plate 524.

Figure 6:
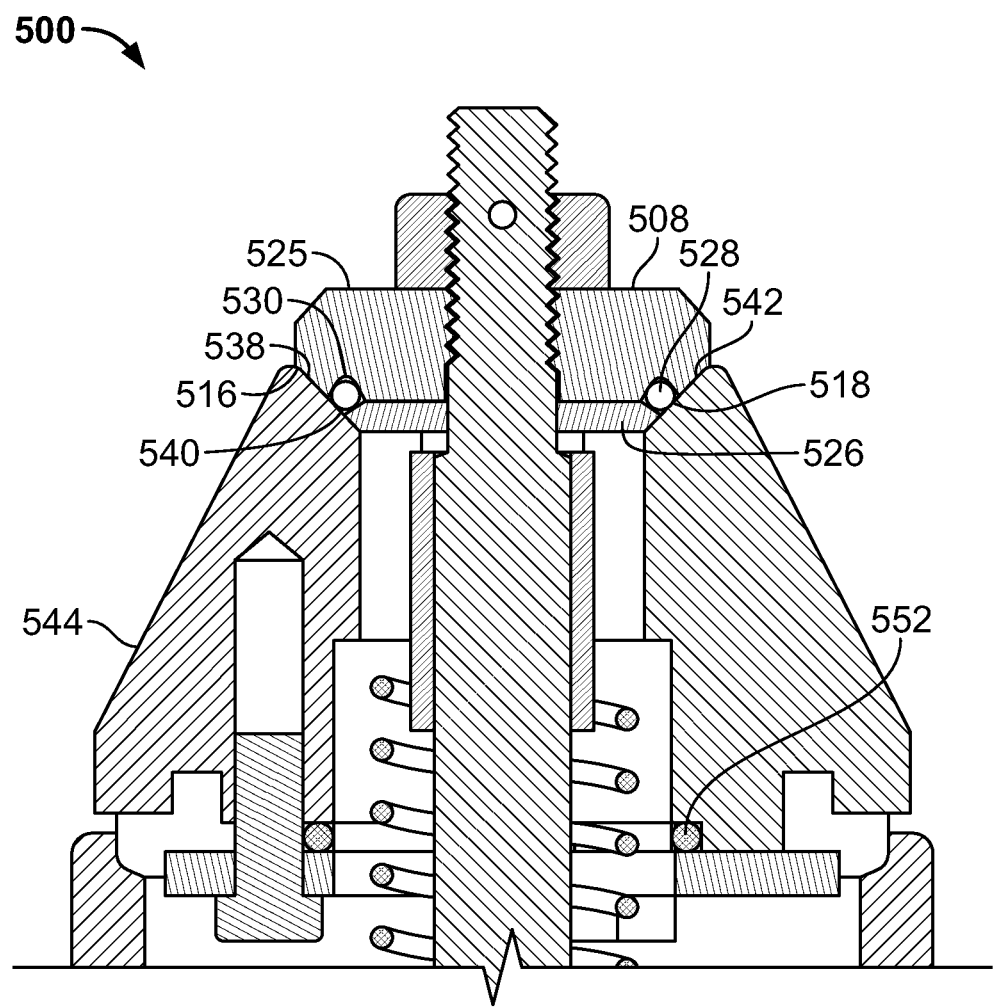
FIG. 6 depicts an enlarged view of the example internal valve of FIG. 5.

Referring to both FIGS. 5 and 6, the plug 508 includes an upper retainer 525 and a lower retainer 526 between which a seal, gasket or o-ring 528 is positioned. In contrast to the molded disc 148 (FIG. 1) described in connection with the internal valve 100 of FIG. 1, the seal 528 is positioned within a groove 530 defined by the upper and/or lower retainers 525 and/or 526 decreasing a distance between the upper retainer 525 and the seat 516 as compared to the position of the retainer 152 (FIG. 1) relative to the seat 154 (FIG. 1) of the known internal valve 100 (FIG. 1). The position of the seal 528 within the groove 530 and the relative proximity of the upper and/or lower retainers 525 and/or 526 to the seat 516 when the internal valve 500 is in the closed position enables a position of the stem 506 to not vary significantly even if the seal 528 wears over time, which limits the variance or change in the gap 165 encountered with the internal valve 100 of FIG. 1. This lack of variance or change of the gap 165 prevents a surface 531 of a stem assembly 532 from engaging a cam 534 when the internal valve 500 is in the closed position, enabling a first spring 536 to extend and to urge the plug 508 and, thus, the poppet 504 toward the body 502. In contrast to the opposing retainers 150 and 152 (FIG. 1) of the internal valve 100 of FIG. 1, the upper retainer 525 includes a tapered surface 538 and, similarly, the lower retainer 526 includes a tapered surface 540 both of which correspond to (e.g., have substantially similar angles or bevels relative to) a tapered surface 542 of the seat 516. These tapered surfaces 538, 540 and/or 542 provide for an integral metal-to-metal seal between the plug 508 and the seat 516 in the event that the seal 528 is worn and/or, alternatively, to provide redundant and/or integral sealing functionality in the event the seal 528 becomes dislodged or otherwise non-existent.

In operation, if the fluid flow increases to a magnitude greater than a predetermined fluid flow (e.g., an excess flow limit), a force exerted by the fluid against an external surface 544 of the poppet 504 overcomes a force exerted by a second spring 546, thereby causing the sealing surface 512 to re-engage the body 502 of the internal valve 500 even though the cam 534 is positioned at the high-point. In this position, while the sealing surface 512 of the poppet 504 engages the body 502 of the internal valve 500, the plug 508 is at a distance from the seat 516 and a surface 548 of a spring seat 550 engages and/or is positioned adjacent to a seal 552 that surrounds the aperture 520. The interaction between the spring seat 550 and the seal 552 controls the flow of fluid through the plurality of fluid flow channels 510 and enables a relatively small amount of fluid to bleed between the chamber or tank and an opening 554 of the body 502.

Figure 7:
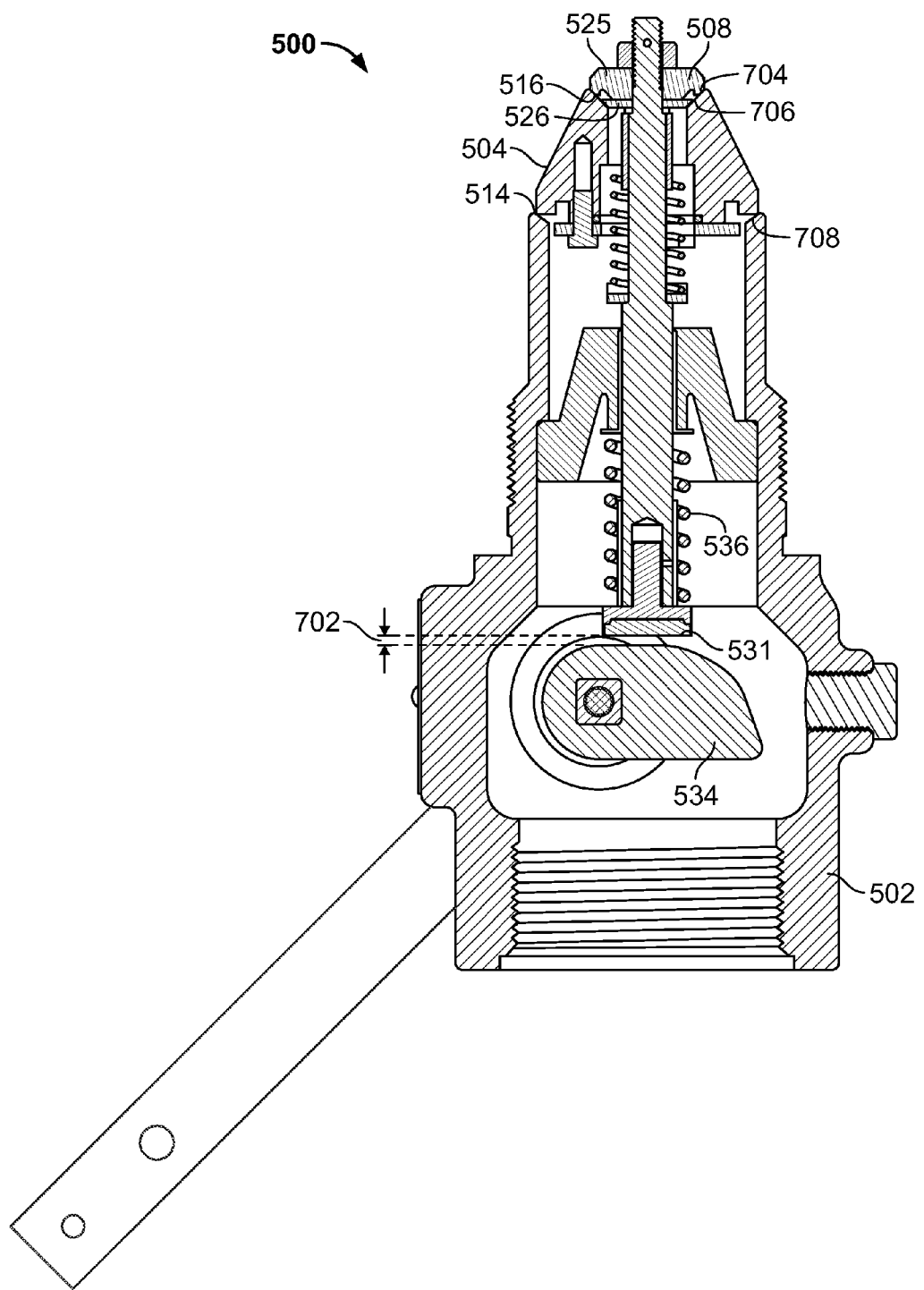
FIG. 7 depicts the example internal valve of FIG. 5 without some of the seals.

As discussed above, due to operating conditions and/or the extent of use, the seals 522 and/or 528 may wear and/or become non-existent over time, thereby reducing or failing to completely provide their sealing functionality. To illustrate such an example, FIG. 7 depicts the example internal valve 500 of FIG. 5 without the seals 522 or 528. In contrast to the internal valve 100 of FIG. 1, the configuration of the plug 508 relative to the seat 516 enables the upper and/or lower retainers 525 and/or 526 to engage the seat 516 even if the seal 528 is eliminated, thereby providing a gap 702 between the surface 531 and the cam 534. The gap 702 enables the first spring 536 to extend and urge the plug 508 and, thus, the poppet 504 toward the body 502 such that a surface or sealing surface 704 and/or 706 of the upper and/or lower retainers 525 and/or 526 engages the seat 516 which, in turn, urges a surface 708 of the poppet 504 to engage the seat 514 of the body 502. The engagement between the respective surfaces 704, 706 and/or 708 and the seats 514 and/or 516 provides for integral redundant sealing functionality, extending the maintenance intervals at which a worn seal must be replaced and/or decreasing the urgency to replace a worn or defective seal.

Figure 8:
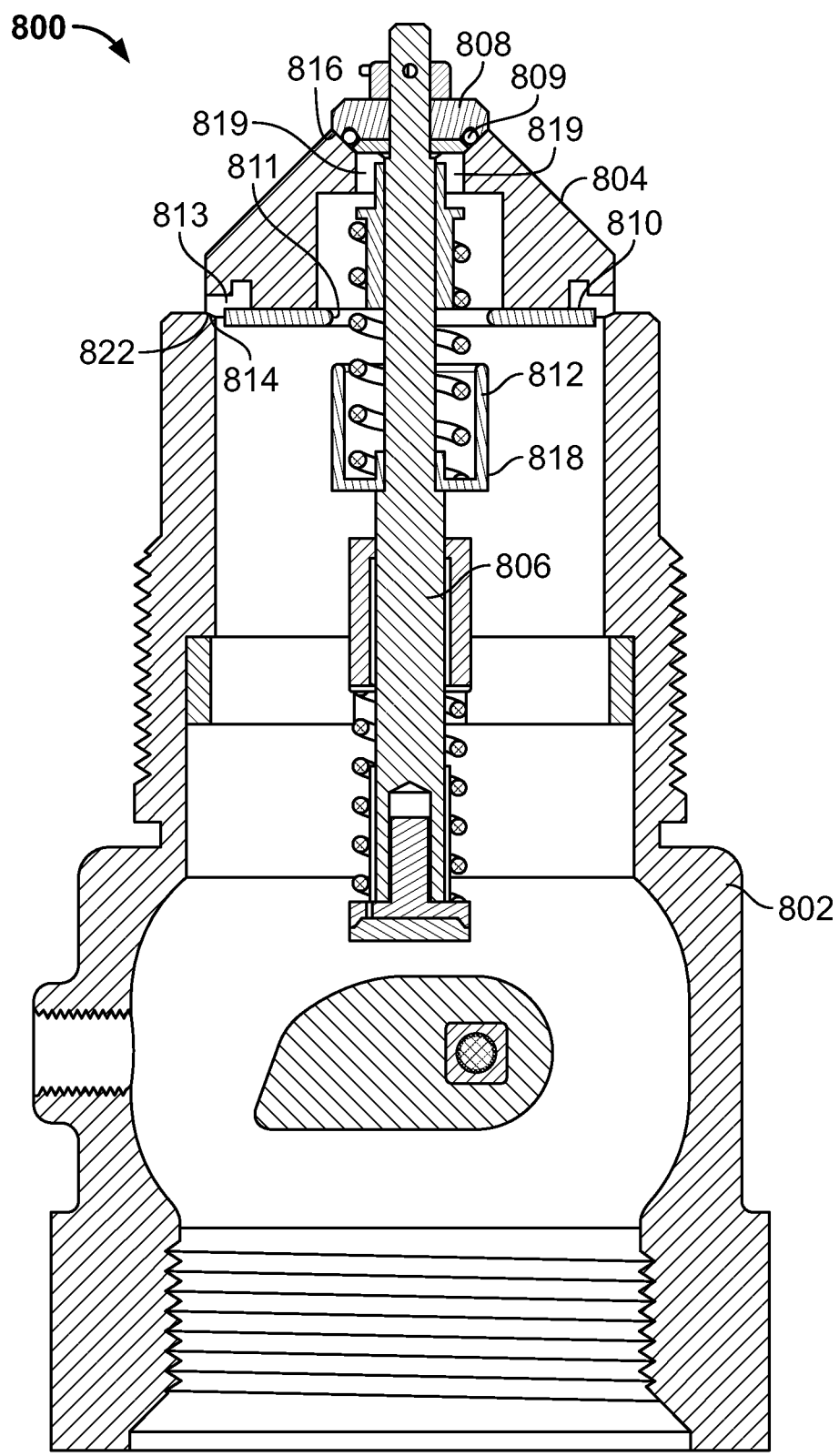
FIGS. 8-13 depict various example valves with and without seals.

FIG. 8 depicts an example valve 800 that includes a body 802, an example flow control member or poppet 804, a stem 806 and an example plug 808 including a seal 809. In contrast to the example internal valve 500 of FIG. 5, the example valve 800 includes a plate 810 having an aperture 811 that has a diameter that corresponds to a diameter of a spring seat 812. Thus, as discussed above, when a seal 813 of a sealing surface 814 of the poppet 804 engages the body 802 of the valve 800 and the plug 808 is at a distance or spaced from a seat 816 of the poppet 804, a surface 818 of the spring seat 812 engages and/or is positioned adjacent to the aperture 811 defined by the plate 810 to control a flow of fluid through a plurality of fluid flow channels 819.

The interaction between the plug 808 and the seat 816 and between the sealing surface 814 and a seat 822 of the body 802 is substantially similar to the interaction between the plug 508 (FIG. 5) and the seat 516 (FIG. 5) and between the sealing surface 512 (FIG. 5) and the seat 514 (FIG. 5) of the body 502 (FIG. 5) of the internal valve 500 of FIG. 5. As such, this description will not be repeated here.

Figure 9:
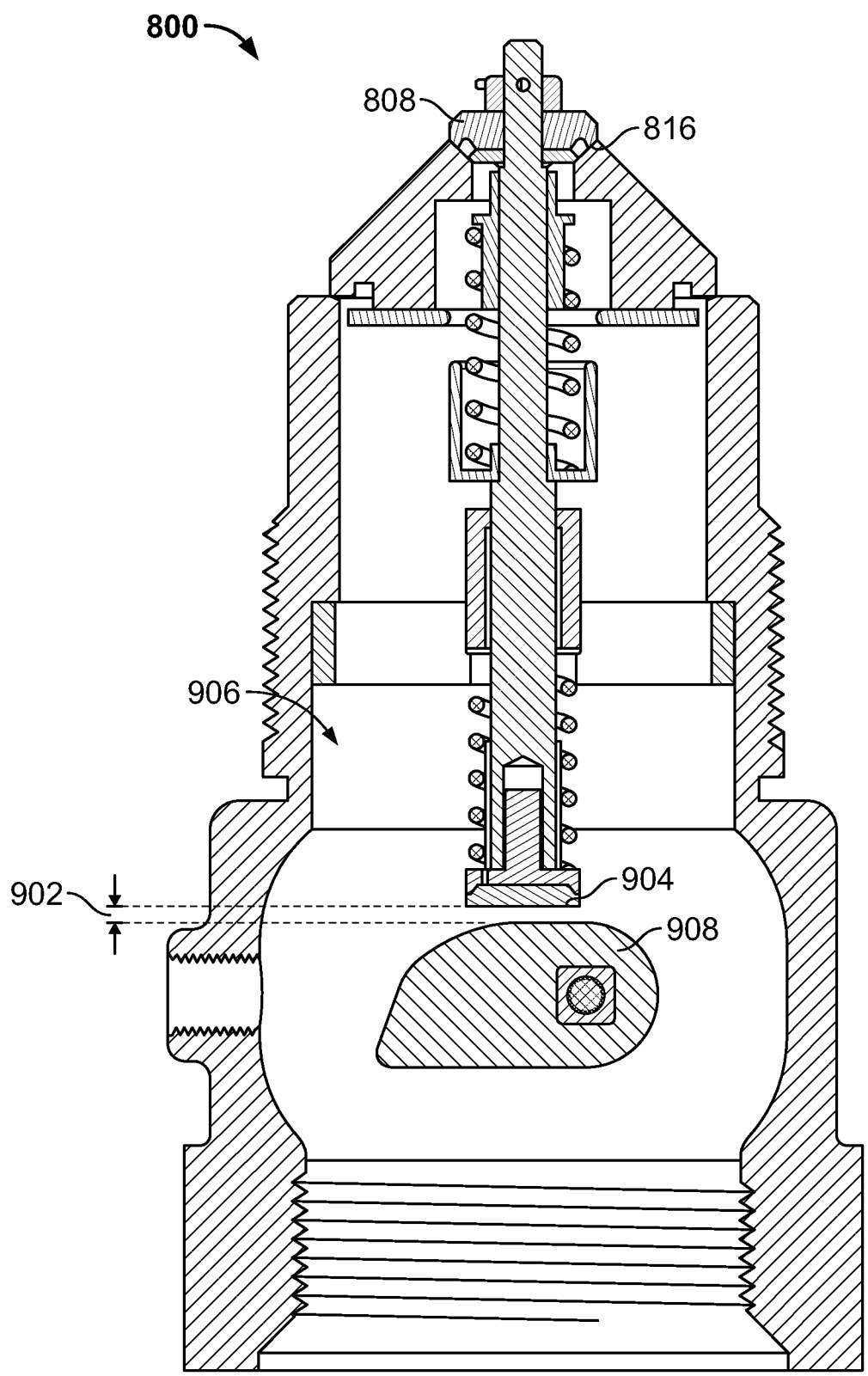

FIG. 9 depicts the example valve 800 without the seals 809 and 813. As shown in FIG. 9, the interaction between the plug 808 and the seat 816 provides a gap 902 between a surface 904 of a stem assembly 906 and a cam 908.

Figure 10:
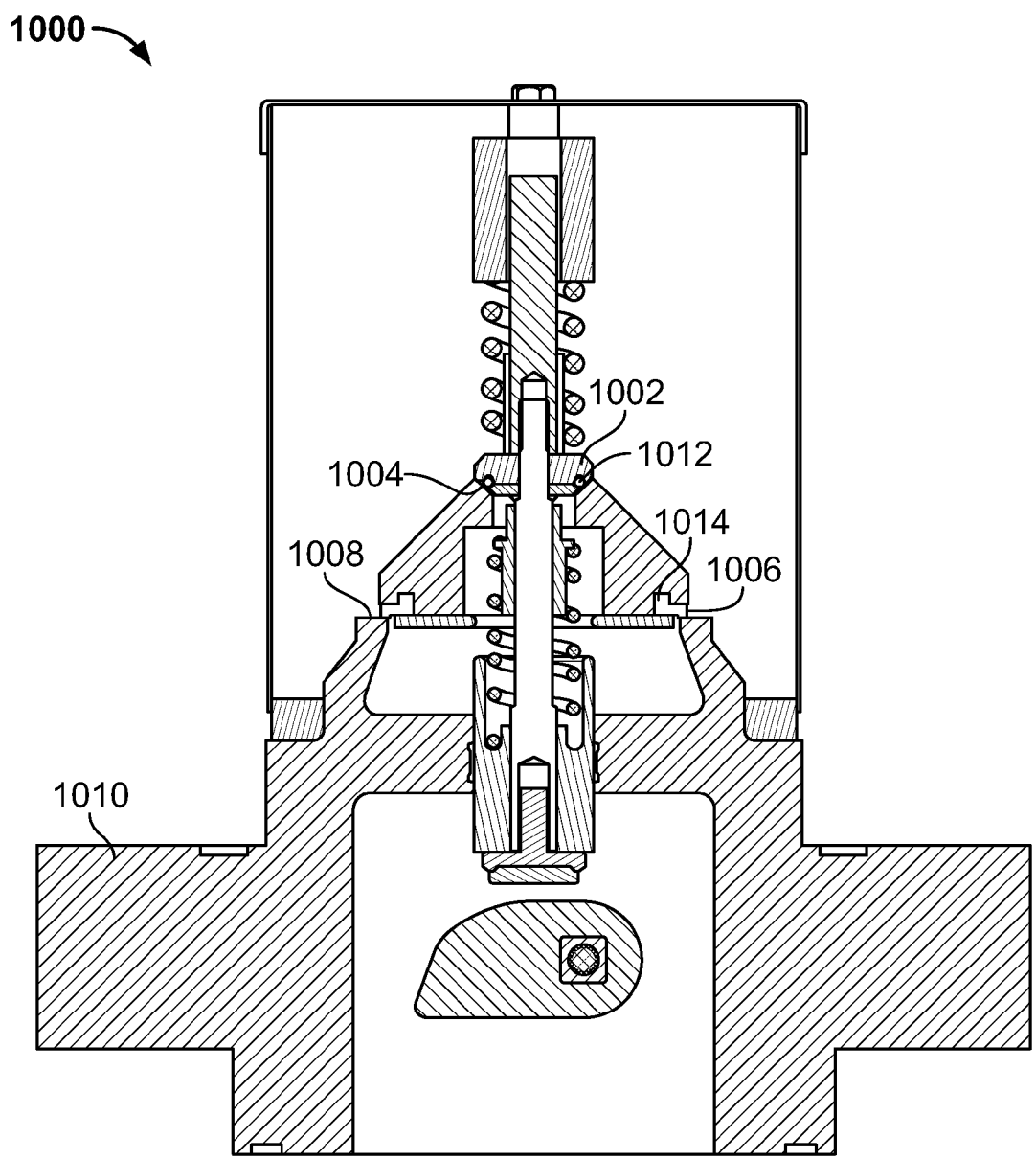

FIG. 10 depicts a valve 1000 that includes a plug 1002, a seat 1004 and a sealing surface 1006 to engage a seat 1008 of a body 1010 of the valve 1000. The interaction between the plug 1002 including a seal 1012 and the seat 1004 and between the sealing surface 1006 including a seal 1014 and the seat 1008 of the body 1010 is substantially similar to the interaction between the plug 508 (FIG. 5) and the seat 516 (FIG. 5) and between the sealing surface 512 (FIG. 5) and the seat 514 (FIG. 5) of the body 502 (FIG. 5) of the internal valve 500 of FIG. 5. As such, this description will not be repeated here.

Figure 11:
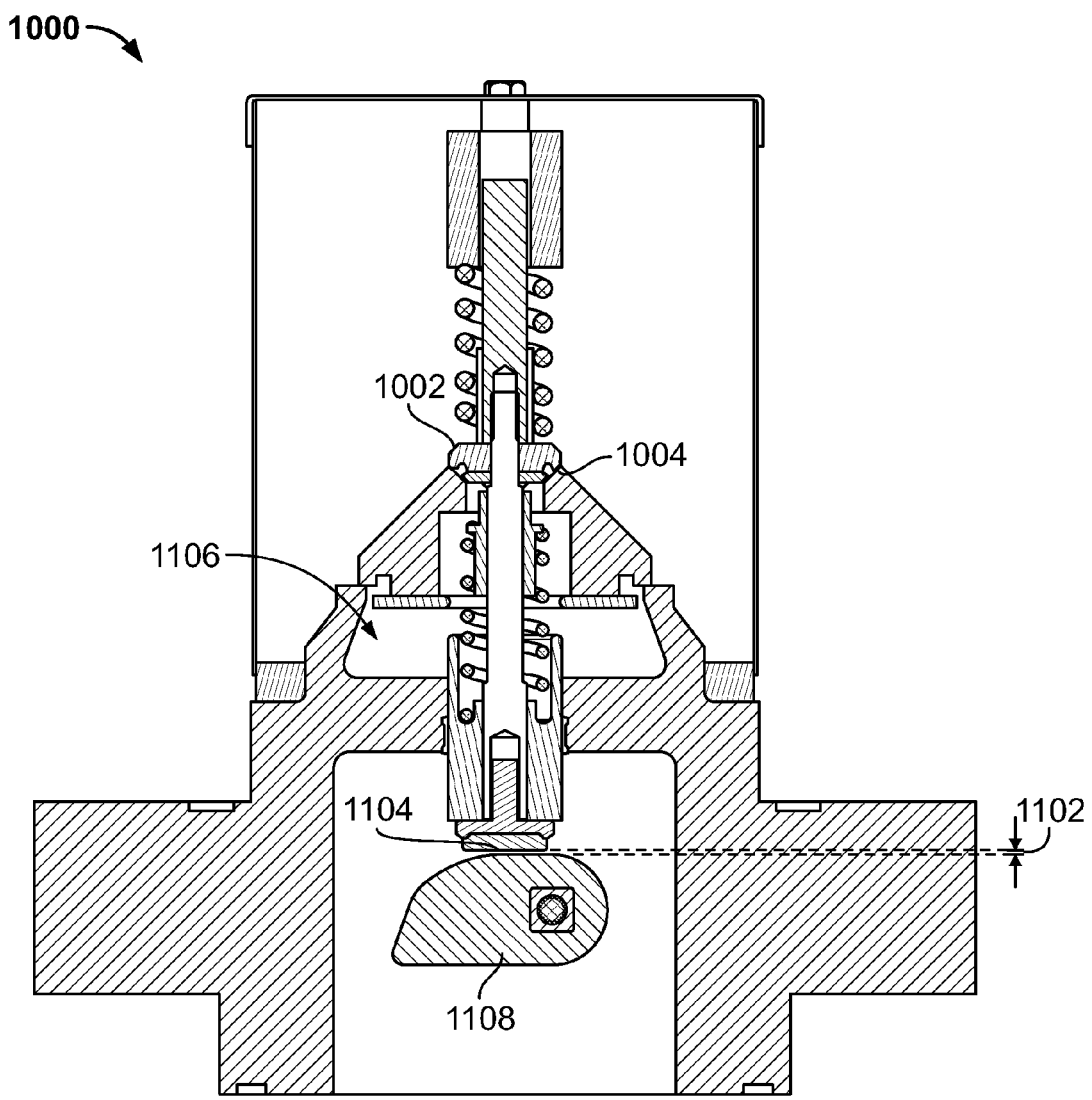

FIG. 11 depicts the example valve 1000 without the seals 1012 and 1014. As shown in FIG. 11, the interaction between the plug 1002 and the seat 1004 provides a gap 1102 between a surface 1104 of a stem assembly 1106 and a cam 1108.

Figure 12:
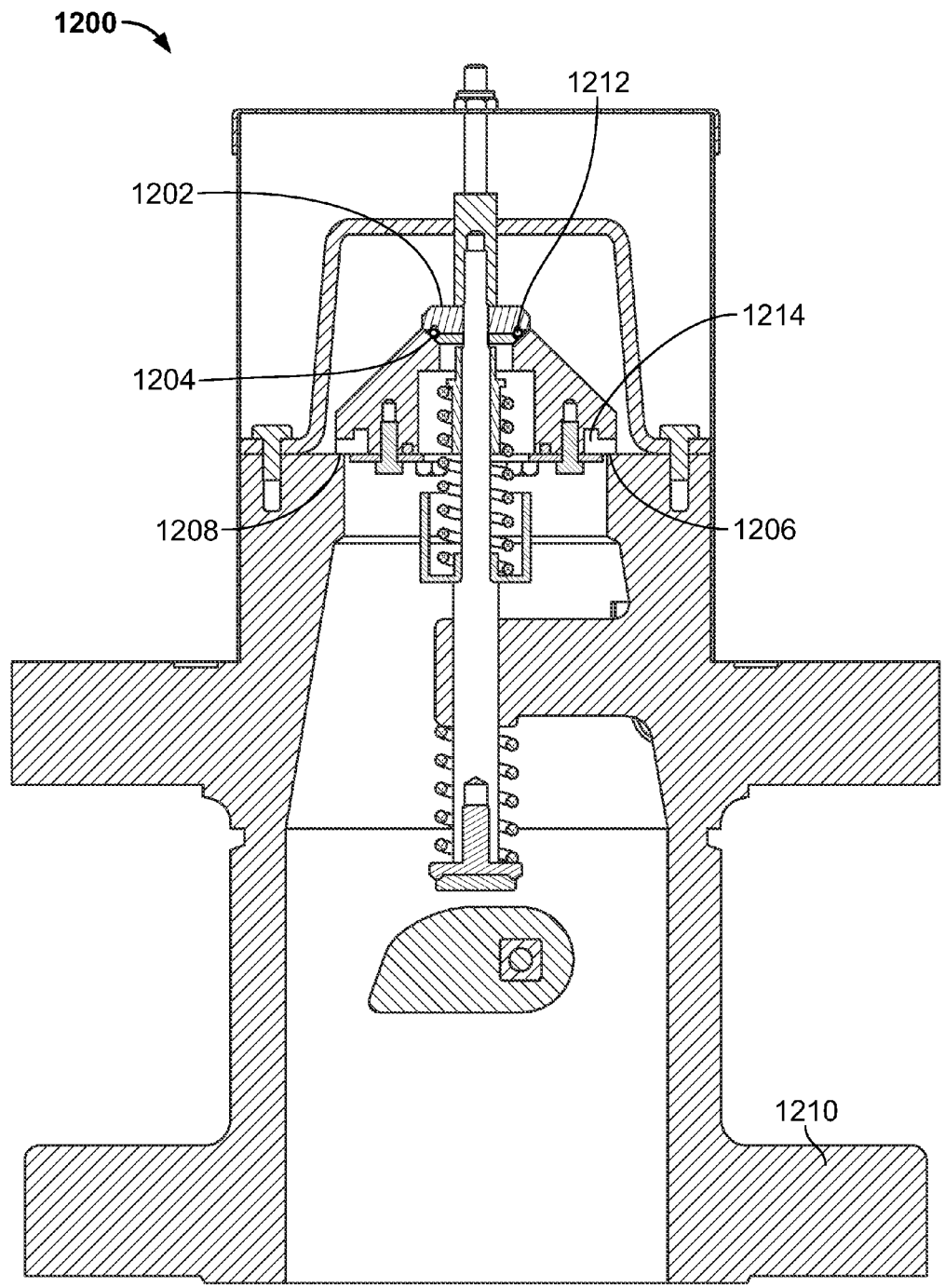

FIG. 12 depicts a valve 1200 that includes a plug 1202, a seat 1204 and a sealing surface 1206 to engage a seat 1208 of a body 1210 of the valve 1200. The interaction between the plug 1202 including a seal 1212 and the seat 1204 and between the sealing surface 1206 including a seal 1214 and the seat 1208 of the body 1210 is substantially similar to the interaction between the plug 508 (FIG. 5) and the seat 516 (FIG. 5) and between the sealing surface 512 (FIG. 5) and the seat 514 (FIG. 5) of the body 502 (FIG. 5) of the internal valve 500 of FIG. 5. As such, this description will not be repeated here.

Figure 13:
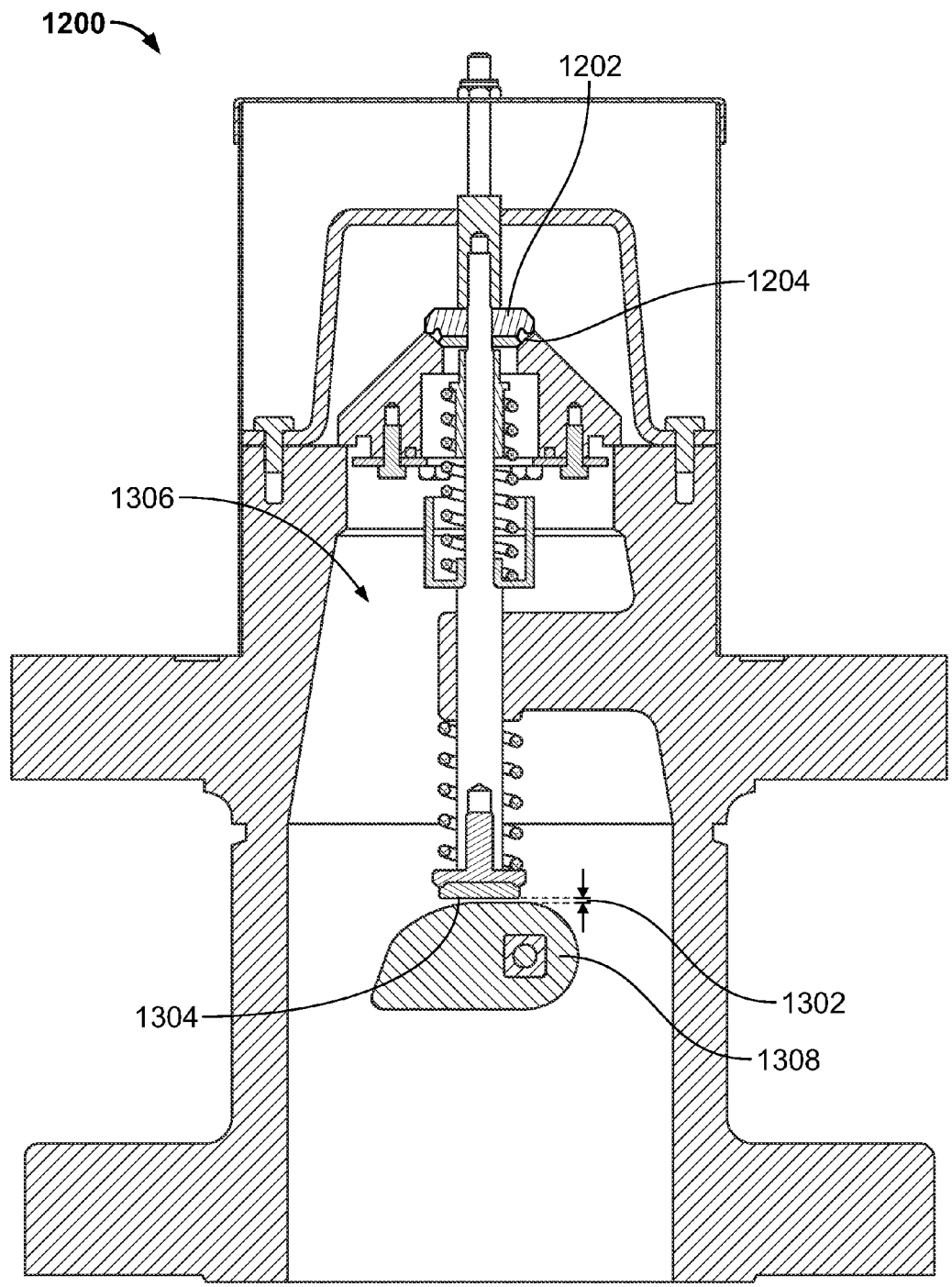

FIG. 13 depicts the example valve 1200 without the seals 1212 and 1214. As shown in FIG. 13, the interaction between the plug 1202 and the seat 1204 provides for a gap 1302 between a surface 1304 of a stem assembly 1306 and a cam 1308.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed:

1. A plug having redundant sealing functionality for use with a poppet of an internal valve, the plug comprising:
   a first retainer;
   a second retainer seated on a stem, the first retainer to be removably coupled to the second retainer by direct connection to the stem, the first retainer comprising a first tapered surface, the second retainer comprising a second tapered surface, the tapered surfaces to sealingly engage a seat of the poppet; and
   a seal adjacent the tapered surfaces and disposed in a groove defined by the first and second retainers to sealingly engage the seat, the tapered surfaces to interact with the seat of the poppet to substantially prevent an end of a stem to which the plug is coupled from engaging a cam of the internal valve when the seal is worn or dislodged and the internal valve is in a closed position.

2. The plug as defined in claim 1, wherein the seal comprises an elastomeric material.

3. The plug as defined in claim 1, wherein one or more of the tapered surfaces comprises a metal surface.

4. A stem assembly for use with an internal valve, comprising:
- a stem having a first end to be engaged by a cam of the internal valve to move the stem to control fluid flow through the internal valve; and
- a plug coupled to a second end of the stem opposite the first end, the plug comprising a first plug portion and a second plug portion, one of a fastener, the first plug portion, or the second plug portion to threadably engage the stem to couple the first and second plug portions to the stem, the plug comprising a first sealing surface and a second sealing surface, wherein the first and second sealing surfaces are to engage a seat of a poppet of the internal valve to provide redundant sealing functionality.

5. The stem assembly as defined in claim 4, wherein the first sealing surface comprises a tapered surface of the plug.

6. The stem assembly as defined in claim 5, wherein the tapered surface comprises a metal surface.

7. The stem assembly as defined in claim 4, wherein the second sealing surface is positioned between a first portion of the first sealing surface and a second portion of the first sealing surface.

8. The stem assembly as defined in claim 7, wherein the second sealing surface comprises a seal at least partially positioned in a groove defined by the plug.

9. The stem assembly as defined in claim 7, wherein the first portion of the first sealing surface comprises a tapered surface of the first plug portion and the second portion of the first sealing surface comprises a tapered surface of the second plug portion.

10. The stem assembly as defined in claim 9, wherein at least one of the first plug portion or the second plug portion defines a groove into which at least a portion of the second sealing surface is positioned.

11. An internal valve, comprising:
- a body that defines a chamber, wherein the body includes external threads to threadably engage another body;
- a stem assembly having at least one biasing element, a stem, and a plug, wherein the stem assembly is to exert a force on a poppet to urge the poppet toward the body to control fluid flow through the internal valve, the plug comprising a first plug portion and a second plug portion, one of a fastener, the first plug portion, or the second plug portion to threadably engage the stem to couple the first and second plug portions to the stem;
- a seal coupled to the stem assembly;
- a cam rotatably coupled to the internal valve to engage an end of the stem assembly to control fluid flow through the internal valve; and
- means for maintaining a gap between the end of the stem assembly and the cam when the seal is worn or dislodged and the internal valve is in a closed position.

12. The internal valve as defined in claim 11, wherein the means for maintaining the gap between the end of the stem assembly and the cam comprises the plug comprising a tapered surface that is to engage a seat of the poppet when the seal is worn or dislodged.

13. The internal valve as defined in claim 11, wherein the means for maintaining the gap between the end of the stem assembly and the cam comprises the plug having first and second sealing surfaces to engage a seat of the poppet to provide redundant sealing functionality.

14. The internal valve as defined in claim 13, wherein the first sealing surface comprises a tapered surface of the plug.

15. The internal valve as defined in claim 14, wherein the first sealing surface comprises a metal material and the second sealing surface comprises an elastomeric material.

16. The internal valve as defined in claim 14, wherein the second sealing surface is positioned between a first portion of the first sealing surface and a second portion of the first sealing surface.

17. The internal valve as defined in claim 16, wherein the second sealing surface comprises the seal disposed in a groove defined by the plug.

18. An assembly for use with an internal valve, comprising:
- a poppet including a tapered seat and an aperture to receive a stem, the stem having a first end to be engaged by a cam of the internal valve to move the stem to control fluid flow through the internal valve; and
- a plug coupled to a second end of the stem opposite the first end, the plug comprising a first tapered surface, a second tapered surface and a seal positioned in a groove between the first and second tapered surfaces, wherein the tapered surfaces and the seal are to engage the tapered seat of the poppet to provide redundant sealing functionality, the tapered surfaces to interact with the seat of the poppet to substantially prevent the first end of the stem from engaging the cam when the seal is worn or dislodged and the internal valve is in a closed position, the plug comprising a first plug portion and a second plug portion, one of a fastener, the first plug portion, or the second plug portion to threadably engage the stem to couple the first and second plug portions to the stem.

* * * * *